Apr. 10, 1923.
J. E. WILSON
1,450,934
AIR CONFINING AND RELEASING VALVE
Filed Sept. 26, 1921
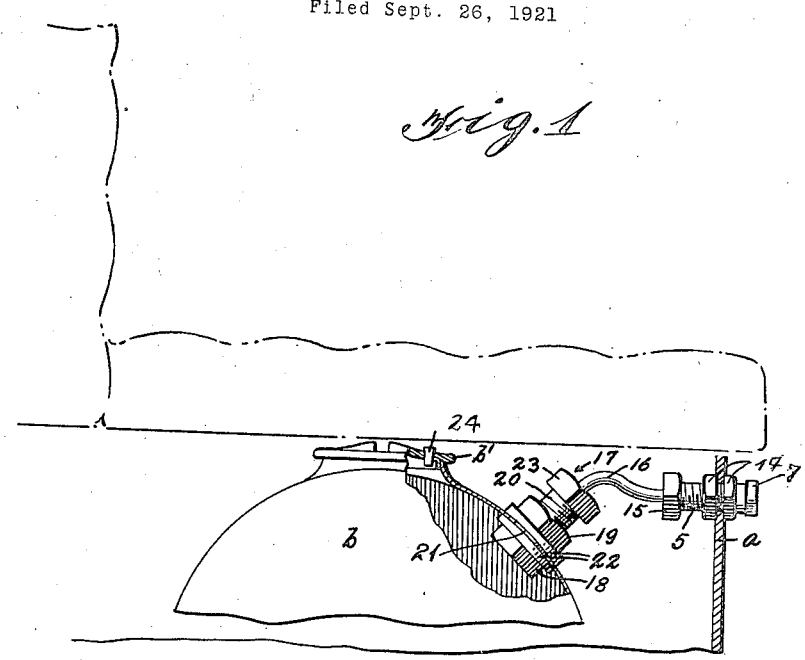
*Fig. 1*
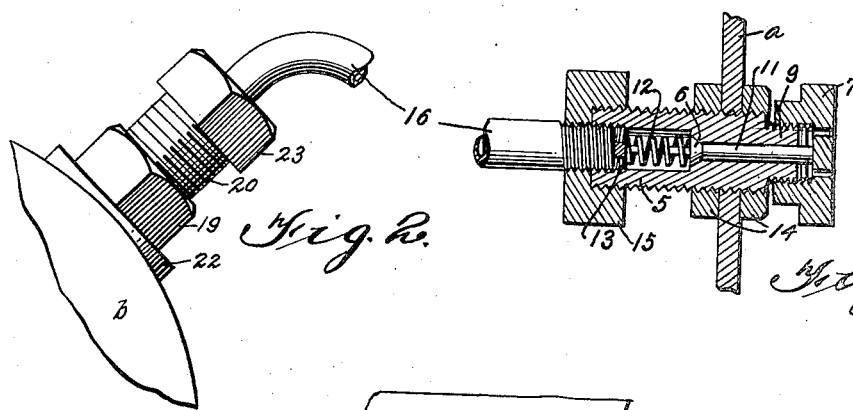
*Fig. 2*   *Fig. 3*
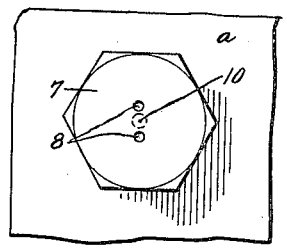
*Fig. 4*
Inventor
J. E. Wilson.
By
Attorney Patented Apr. 10, 1923.

1,450,934

UNITED STATES PATENT OFFICE.

JESSE E. WILSON, OF OXFORD JUNCTION, IOWA.

AIR CONFINING AND RELEASING VALVE.

Application filed September 26, 1921. Serial No. 503,210.

*To all whom it may concern:*

Be it known that I, JESSE E. WILSON, a citizen of the United States, residing at Oxford Junction, in the county of Jones and State of Iowa, have invented certain new and useful Improvements in Air Confining and Releasing Valves, of which the following is a specification.

This invention relates to liquid dispensing devices, and more specifically to an improved air confining and releasing valve.

One object of this invention is to provide an improved check-valve through which air can be pumped into a tank, which maintains air pressure in the tank, and which can quickly and easily be opened for releasing the air pressure in the tank.

A further object is to so combine a valve of this character with a gasoline tank, or other liquid fuel tank, of an automobile, that the climbing of hills in the automobile is facilitated when the liquid fuel is so low in the tank that it would not feed the carbureter without the application of air-pressure to force liquid fuel from the tank to the carbureter while the latter is abnormally elevated in consequence of the inclined position of the automobile on the hillside.

Other objects and advantages will be pointed out or implied in the following details of description in connection with the accompanying drawings in which:

Fig. 1 is a view illustrating a portion of an automobile having my improved check-valve and tank-connection installed under a seat of the automobile.

Fig. 2 is an enlarged fragmental view.

Fig. 3 is a sectional view illustrating the details of construction of my improved check-valve, also its connection with the pipe which connects it to the fuel-tank.

Fig. 4 is an enlarged outer end view of my improved check-valve engaged with a supporting plate through which it extends as in Fig. 1.

Referring to these drawings in detail, in which similar reference characters correspond with similar parts throughout the several views, and in which the seat-box $a$, and tank $b$, may be of any appropriate or well known construction, the invention consists in the construction and arrangement of valve elements per se and in combination with the parts $a$ and $b$, as will now be fully described as follows:

Referring now to Fig. 3, it will be seen that my improved check-valve comprises a tubular valve-body 5, a closing member 6 and a screw-cap 7, the latter being provided with openings 8 through which air passes from the valve-body 5. The member 7 is screwed onto the air inlet 9 of the valve-body and is provided with an element 10, between the openings 8, which presses the closing member 6 inward when the member 7 is screwed inward; the member 6 being provided with a stem 11 which extends towards and into the air inlet 9. However, when the member 7 is screwed outward, it permits the closing member 6 to move into the valve-closing position. A spring 12 is seated on a spring-seat 13, in the valve-body 5, and this spring constantly tends to press the closing member 6 outward into the valve-closing position; and moreover, the frictional engagement of the stem 11 against the member 7, when the latter is moved inward, serves substantially in the capacity of a nut lock to prevent the member 7 from unscrewing and losing.

The exterior of the member 5 is screw-threaded from end to end and a pair of nuts 14 are engaged with the external screw-threads and co-act therewith for clamping the plate $a$ or any similar support for the check-valves. On the inner end of the body 5 is a pipe connector 15 which engages the external screw-threads of this member 5 and connects it with a pipe 16. The other end of this pipe is secured to and in open communication with a tank-connection which is generally indicated by the numeral 17 in Figs. 1 and 2. This tank-connection includes a head 18 and a nut 19, the former being preferably integral with an externally threaded shank 20 which extends through an opening 21 in the tank $b$. The nut 19 is threaded on the shank 20, and a pair of pliable washers or gaskets 22 are seated between the head 18 and nut 19, at opposite sides of the openings 21, so that when the nut 19 is tightened, the washers 22 clamp the material around the opening 21 and prevent leakage through this opening. A nut or cap 23 secures the pipe 16 to the shank 20 in a well known manner.

In order that the structure, thus far described, may be applied to an ordinary gasoline tank, the opening 21 can be made in the tank $b$ by any appropriate means, and any appropriate means may be provided for preventing leakage around and through the filling-opening-cap $b^1$. A plug or stopper of rubber or other appropriate material is indicated at 24 for preventing leakage through this cap.

When the tank $b$ has thus been rendered air-tight at its filling opening, and is thus connected with my improved valve, it has no escape for air and liquid except through the outlet (not shown) which connects it to the carburetor (not shown). Therefore, when air is pumped into the tank through the valve and its connections, it tends to escape through the liquid fuel outlet. However, it cannot escape so long as this outlet is covered by the liquid, and so the air accumulates and creates a pressure upon the liquid, thereby forcing the liquid through said outlet. As previously indicated, the air-pressure is not needed or desired except when the carburetor is at an abnormal level with respect to the tank, as when the automobile is ascending a hill, and a few strokes of an ordinary pump will be sufficient to generate enough pressure to elevate the liquid fuel to the carburetor, even when the supply of liquid fuel is very low in the tank. When not ascending a hill, it is desired to quickly relieve the air-pressure in the tank $b$, and this may be done by turning the member 7 a revolution or sufficiently to press the closing member 6 inward. When it is again desired to ascend a hill while the liquid fuel is low in the tank $b$, the operator unscrews and removes the member 7, thus permitting the valve to close, and then attaches a pump to the body 5 and then pumps air into the tank $b$ by a few strokes of the pump.

From the foregoing, it will be understood that this is an emergency device, especially useful when the supply of gasoline is low in the fuel tank; but it is also useful even when the tank is approximately full, for pre-carbureting the liquid fuel and thereby assisting ignition under unusual circumstances.

It is not intended to limit this invention to the exact construction and arrangement shown and described, but changes may be made within the scope of the inventive ideas as implied and claimed.

What I claim is:

A valve for fuel supply systems of motor vehicles comprising a body portion provided with a reduced threaded end adapted to be engaged by an air hose coupling, and with a bore, a counterbore, and a valve seat at the junction of said bore and counterbore; a valve adapted to engage said seat, provided with a stem passing through said bore; a spring seat within said counterbore; a spring interposed between said spring seat and said valve, normally tending to seat said valve; and a perforated cap normally threaded on said reduced end, and adapted to engage the end of said valve stem to unseat said valve against the action of said spring.

In testimony whereof, I affix my signature.

JESSE E. WILSON.